United States Patent
Sadler

(10) Patent No.: US 6,290,534 B1
(45) Date of Patent: *Sep. 18, 2001

(54) SUPPORT ASSEMBLY FOR PERSONAL ELECTRONIC DEVICE AND METHOD FOR USING THE SAME

(75) Inventor: John Thomas Sadler, Raleigh, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/775,245

(22) Filed: Feb. 1, 2001

Related U.S. Application Data

(63) Continuation of application No. 09/268,849, filed on Mar. 16, 1999, now Pat. No. 6,193,546.

(51) Int. Cl.[7] .............. H01R 13/60; H01R 35/00
(52) U.S. Cl. .............. 439/534; 439/929; 439/164
(58) Field of Search .............. 439/929, 164, 439/289, 135, 137, 138, 534, 554, 557, 500, 502, 121; 361/683, 686, 724, 725, 727; 455/90, 344, 347, 348

(56) References Cited

U.S. PATENT DOCUMENTS

| | | | |
|---|---|---|---|
| 4,426,122 | * 1/1984 | Lainez et al. | 339/45 M |
| 4,611,864 | 9/1986 | Yokota | 312/12 |
| 4,773,032 | 9/1988 | Uehara et al. | 364/709.04 |
| 5,256,955 | 10/1993 | Tomura et al. | 320/2 |
| 5,354,216 | 10/1994 | Cruise et al. | 439/553 |
| 5,627,727 | * 5/1997 | Aguilera et al. | 361/686 |
| 5,697,808 | 12/1997 | Chen | 439/500 |
| 5,751,548 | * 5/1998 | Hall et al. | 361/686 |
| 5,799,914 | 9/1998 | Chivallier et al. | 248/176.1 |
| 5,859,762 | * 1/1999 | Clark et al. | 361/686 |
| 5,888,087 | 3/1999 | Hanson et al. | 439/374 |
| 5,964,601 | 10/1999 | Tsurumaru et al. | 439/141 |
| 6,193,546 | * 2/2001 | Sadler | 439/534 |

FOREIGN PATENT DOCUMENTS

| | | | |
|---|---|---|---|
| 44 33 363 C1 | 5/1996 | (DE) | H04B/1/38 |
| 195 39 784 A1 | 4/1997 | (DE) | B60R/11/00 |
| 0 617 535 A2 | 9/1994 | (EP) | H04M/1/60 |
| 0 844 771 A2 | 5/1998 | (EP) | H04M/1/03 |
| 0 887 233 A2 | 12/1998 | (EP) | B60R/11/02 |
| 03085949 | 4/1991 | (JP) | H04M/1/11 |

OTHER PUBLICATIONS

International Search Report, PCT/US00/03846, Jun. 20, 2000.

* cited by examiner

Primary Examiner—Karl D. Easthom
Assistant Examiner—Kyung S. Lee
(74) Attorney, Agent, or Firm—Myers Bigel Sibley & Sajovec

(57) ABSTRACT

An assembly for supporting a personal electronic device includes a base and a holder. The holder is adapted to hold the device. The holder is removably connected to the base such that the holder may be selectively removed from and replaced on the base. Also, the holder is adjustably movably connected to the base such that the holder may be repositioned relative to the base. The device may thereby be reoriented relative to the base and, thus, a support surface, when mounted in the holder. A method for handling a personal electronic device includes mounting the device in a holder, mounting the device and the holder on a base, repositioning the holder relative to base to position the device as desired while the holder is mounted on the base, and removing the device and the holder from the base.

12 Claims, 8 Drawing Sheets

SUPPORT ASSEMBLY FOR PERSONAL ELECTRONIC DEVICE AND METHOD FOR USING THE SAME

RELATED APPLICATIONS

This a continuation of pending U.S. patent application Ser. No. 09/268,849, filed Mar. 16, 1999, now U.S. Pat. No. 6,193,546, the disclosure of which is hereby incorporated herein by reference in its entirety.

FIELD OF THE INVENTION

The present invention relates to personal electronic devices and, more particularly, to stands for holding and supporting personal electronic devices.

BACKGROUND OF THE INVENTION

As personal electronic devices such as portable telephones and portable electronic organizers have become smaller, less expensive, more powerful and more versatile, users have begun to rely on such devices to greater degrees. Typically, the user of a personal electronic device desires to maintain the ability to use his or her personal electronic device both at his/her desk or other workstation and when mobile.

In order to facilitate convenient and effective use of personal electronic devices such as personal electronic organizers, holder stands for one, or more devices have been developed which incorporate battery charging ports, but which do not allow for angular adjustment of the electronic device. Also, stands for devices have been developed which allow adjustment of the angle of an electronic device. In order to aid in carrying personal electronic devices, holders have been provided which will hold a personal electronic device upright on a support surface such as a desk and also clip to a user's clothing.

While the foregoing stands and holders facilitate transport and use of personal electronic devices, they still fail to provide as wide a range of convenience, versatility and usability as may be desired by a user of a personal electronic device who wishes to use his or her personal electronic device in both a stationary manner and when traveling.

SUMMARY OF THE INVENTION

The present invention is directed to an assembly for supporting and holding a personal electronic device. The assembly provides enhanced convenience, effectiveness and versatility in using, transporting and protecting the personal electronic device. The assembly includes a base and a holder adapted to hold the device. The holder is removably connected to the base such that the holder may be selectively removed from and replaced on the base. Also, the holder is adjustably connected to the base such that the holder may be repositioned relative to the base. The device may thereby be reoriented relative to the base and, thus, a support surface, when mounted in the holder. The assembly allows a user to both mount the device on the base and remove the device from the base for portability while retaining the device in the holder for protection and ease of carrying. Additionally, the assembly allows the user to adjust the orientation of the device to provide improved viewability and/or glare reduction, for example.

Preferably, the holder is rotatable with respect to the base. Preferably, the holder includes a clip adapted to secure the holder to a user. The base may include an electrical power connector. Additionally, the base may include a battery charger slot. The assembly may include an electrical connector adapted to engage an electrical connector of the device. A peripheral device connector may be electrically connected to the electrical connector. A printed circuit board may be mounted in the base. Preferably, the base is formed of a polymeric material. Preferably, the holder is rotatable relative to the base through a range of at least about 50 degrees.

The assembly may include a hinge member rotatably connecting the holder to the base. According to a preferred embodiment, the hinge member includes a hinge block rotatably connected to the base and releaseably connected to the holder. An electrical connector may be mounted on the hinge block. A slot may be formed in the holder for receiving the electrical connector. Preferably, the assembly includes a latch for selectively and releaseably securing the holder to the hinge block. The latch may be integrally formed with the hinae block. Means may be provided for selectively adjusting and retaining an angle between the holder and the base. The adjusting and retaining means may include a plurality of detents on the hinge block, the detents adapted to engage the base.

According to an alternative preferred embodiment, the hinge member includes at least one tab secured to and depending from the holder. The tab is receivable in the base. The assembly may include a hinge projection extending from the tab and a latch member. The latch member selectively engages the hinge projection to restrict removal of the tab from the base. Preferably, the assembly includes means for selectively adjusting and retaining an angle between the holder and the base. The adjusting and retaining means may include a plurality of detents on the tab, wherein the detents are adapted to engage the base. The assembly may include a latch mechanism operable to selectively restrict removal of the tab from the base. Preferably, a slot is formed in the holder and an electrical contact extends from the base and through the slot when the holder is mounted on the base. More preferably, the electrical contact includes a contact loop having a loop axis and the holder has a rotational axis collinear with the loop axis.

The present invention is further directed to a method for handling a personal electronic device. According to the method, the device is mounted in a holder. The device and the holder are mounted on a base. The holder is repositioned relative to the base to position the device as desired while the holder is mounted on the base. The method further includes the step of removing the device and the holder from the base.

The method may further include, following the step of removing the device and the holder, the step of remounting the device and the holder on the base. Following the step of removing the device and the holder, the holder may be mounted on a user by means of a clip forming a part of the holder.

DETAILED DESCRIPTION OF THE PREFERRED EMBODIMENTS

Figure 1:
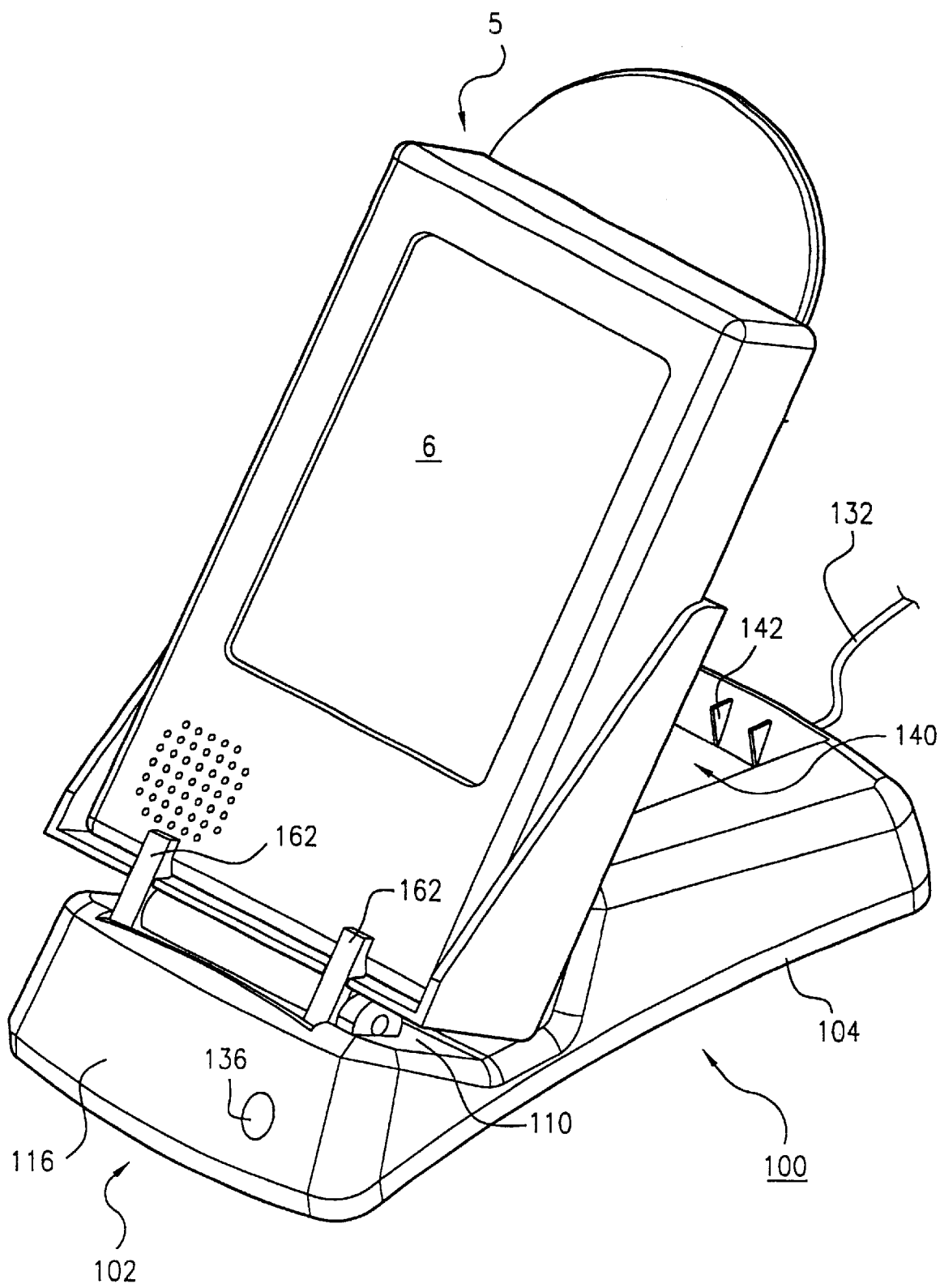
FIG. 1 is a perspective view of a personal electronic device stand and holder assembly according to a first embodiment of the present invention and a personal electronic device mounted therein.
Figure 2:
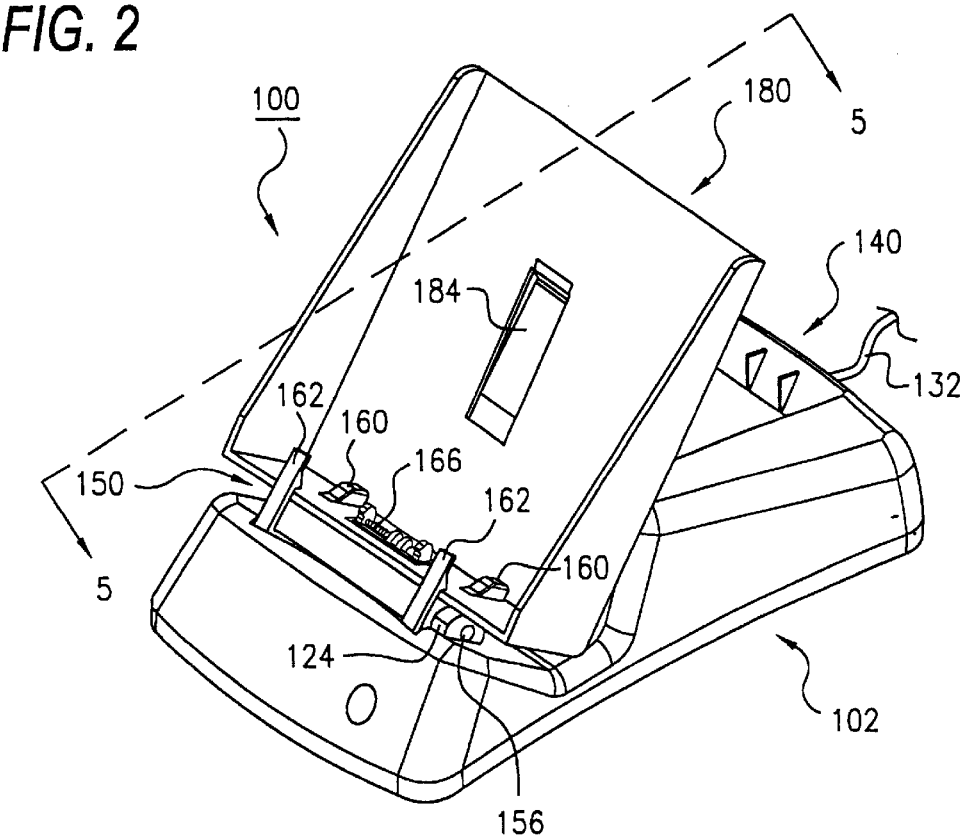
FIG. 2 is a perspective view of the personal electronic device stand and holder assembly of FIG. 1.
Figure 3:
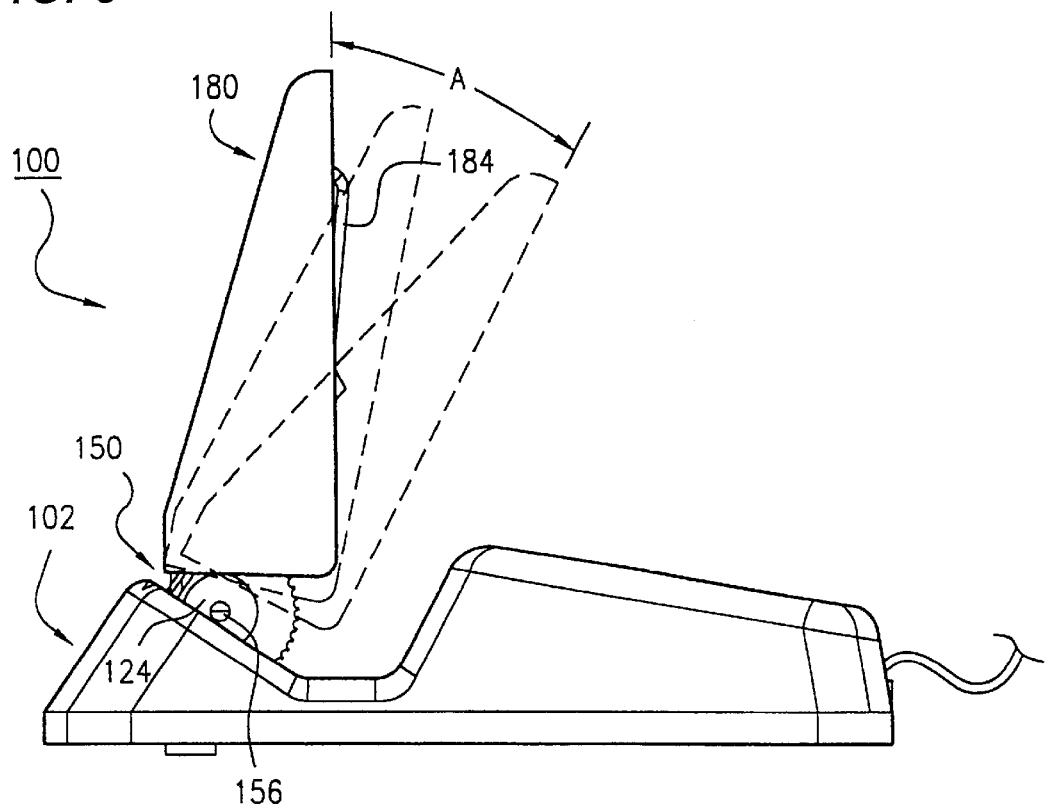
FIG. 3 is a side elevational view of the personal electronic device stand and holder assembly of FIG. 1, a holder thereof being shown in dashed lines in different orientations relative to the base.
Figure 4:
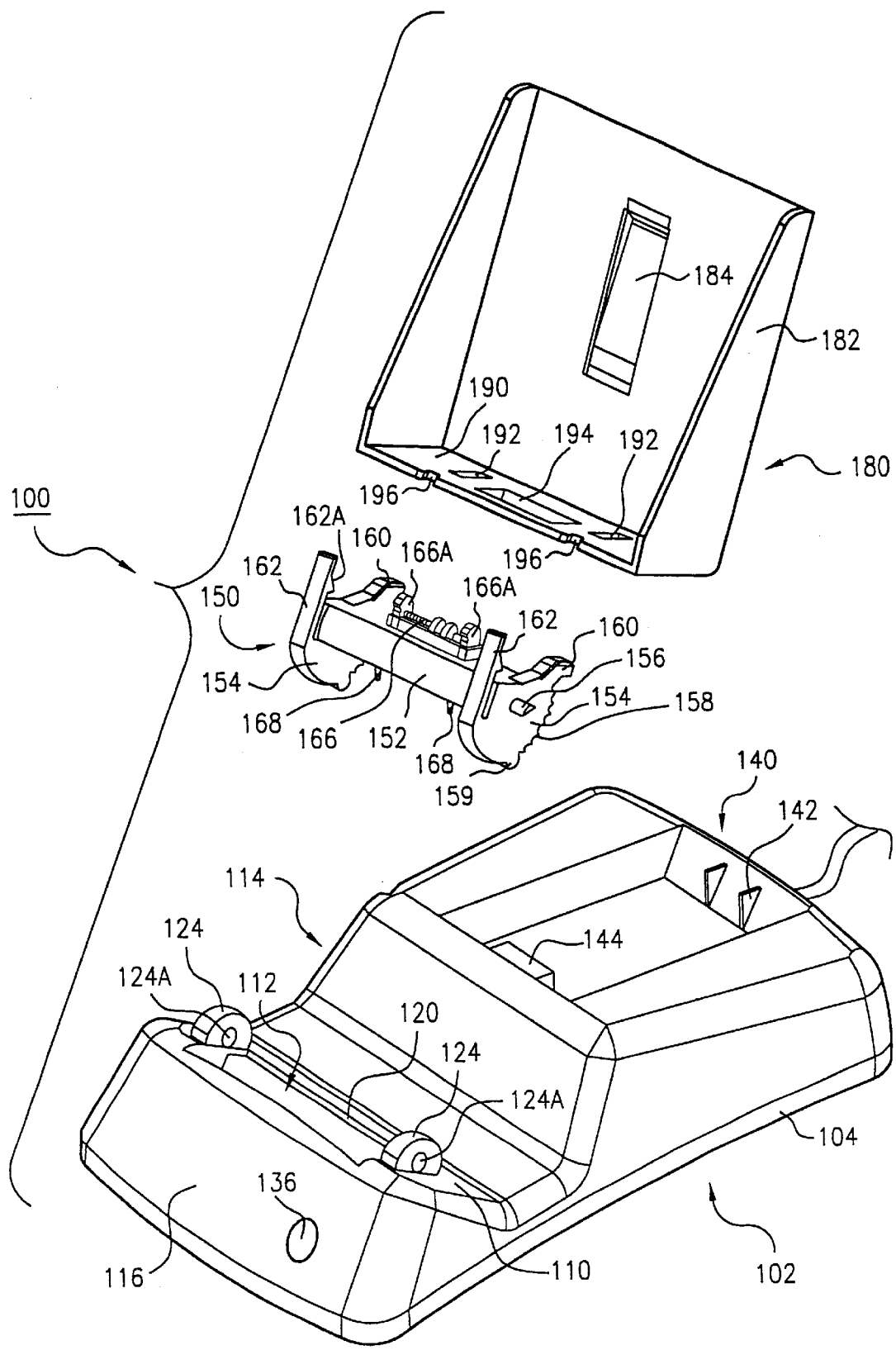
FIG. 4 is an exploded view of the personal electronic device stand and holder assembly of FIG. 1.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

With reference to FIGS. 1–6, a personal electronic device stand and holder assembly according to a first embodiment of the present invention is shown therein and generally designated 100. As shown in FIG. 1, the assembly 100 may be used to support and hold a personal electronic device 5 such as a personal electronic organizer having a display 6, for example a liquid crystal display (LCD). As will be appreciated by those of ordinary skill in the art, the assembly 100 may be used to support and hold other types of personal electronic devices having displays, such as cellular phones, portable televisions, calculators and the like.

The assembly 100 includes a base 102 and a holder 180. The holder 180 is adapted to securely and releaseably hold the personal electronic device 5. Additionally, the holder 180 is movable with respect to the base 102 to selectively adjust the angle of the holder 180, and thus, the display 6, relative to the base 102 (and, thus, the support surface (not shown)) upon which the base 102 is mounted. In this way, the user may tilt the holder 180 and the personal electronic device 5 forward and back as appropriate to adjust the viewing angle of the display 6. The display angle may be adjusted to minimize glare or improve LCD clarity, for example.

Also, as will be described in greater detail below, the holder 180 may be selectively secured to, removed from and resecured to the base 102 as desired. Accordingly, the user may mount his/her personal electronic device 5 in the holder 180 and then mount the holder 180 and device 5 on the base 102 when stationary and remove the holder 180 and device 5 from the base 102 when mobile. As such, the holder 180 may remain with the device 5 at all times, and provide protection from potentially damaging impacts and other abuses to the device 5. Moreover, the holder 180 includes a clip 184 for mounting the holder 180 and device 5 on the wearer's clothing (for example, belt or pocket) or other personal effects.

The assembly 100 can further include means for powering the device 5, means for connecting the device 5 to another device or devices (for example, a telephone communication line, a network communication line, or a personal computer), and means for electrically charging a supplemental battery (not shown) or another personal electronic device.

Figure 5:
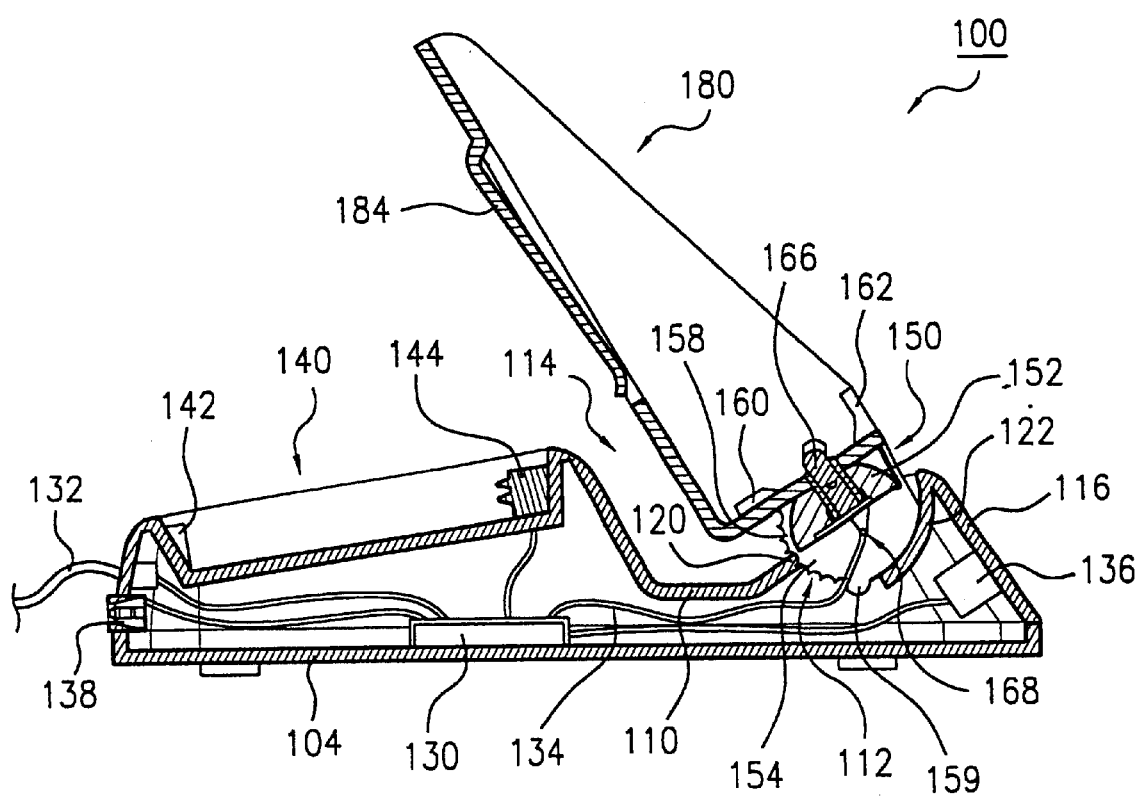
FIG. 5 is a cross sectional view of the personal electronic device stand and holder assembly of FIG. 1 taken along the line 5—5 of FIG. 2.
Figure 6:
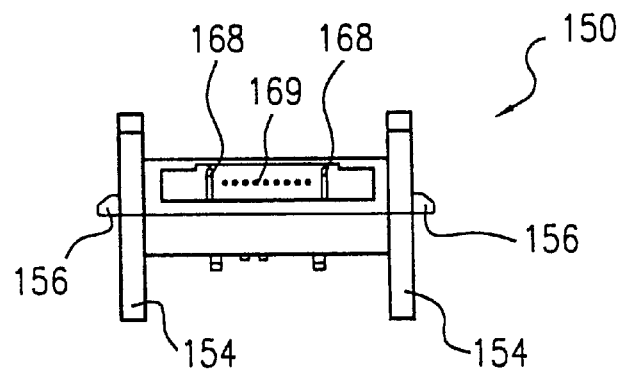
FIG. 6 is a bottom plan view of a hinge block of the personal electronic device stand and holder assembly of FIG. 1.
Figure 7:
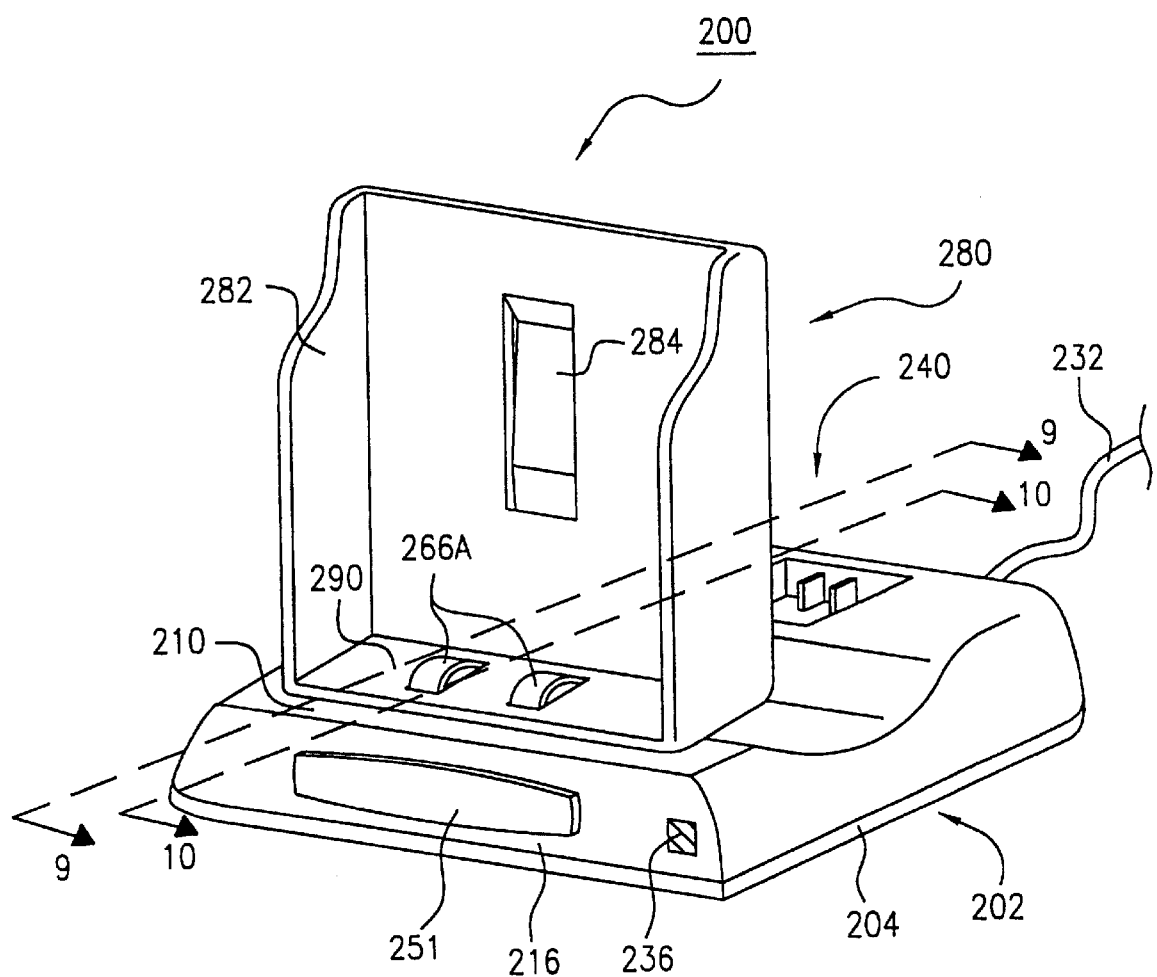
FIG. 7 is a perspective view of a personal electronic device stand and holder assembly according to a second embodiment of the present invention.
Figure 8:
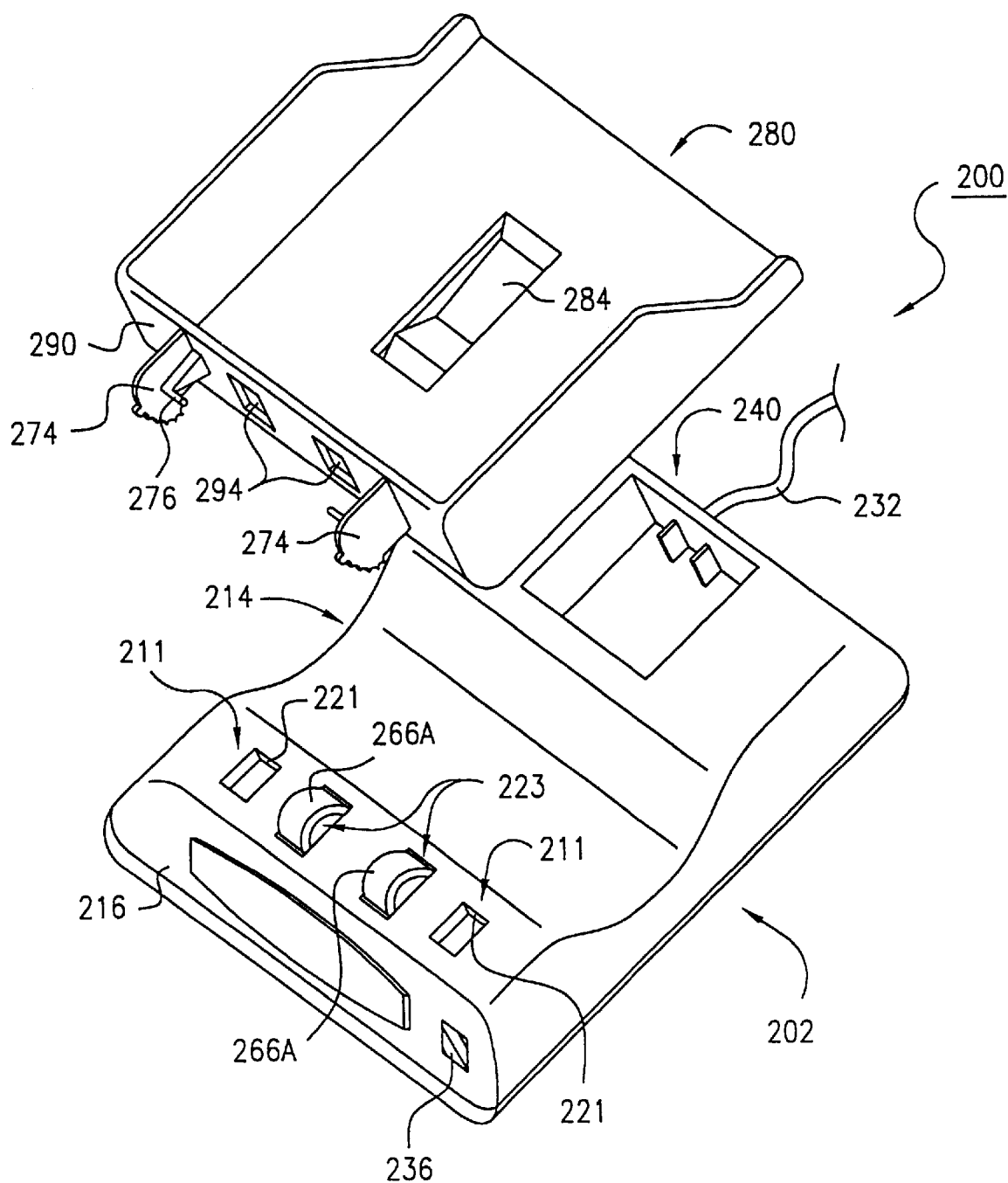
FIG. 8 is an exploded view of the personal electronic device stand and holder assembly of FIG. 7.

Turning to the assembly 100 in more detail, the base 102 is preferably formed of a molded polymeric material and, more preferably, of acrylonitrile-butadiene-styrene terpolymer (ABS) or polstyrene. As best seen in FIG. 5, the base 102 includes a bottom plate 104 and a mating top member 110 which is interlocked with the bottom plate 104. The bottom plate 104 and the top member 110 define a cavity therebetween which encases various electrical and mechanical elements of the assembly 100. The top member 110 includes a battery receptacle 140, a pivot recess 114, a front wall 116, a slot 112, and a curved wall 122. A pair of hinge tabs 124 having respective through holes 124A extend upwardly on either side of the slot 112 and an edge 122 extends along the rear of the slot 112.

A printed circuit board 130 is housed in the base 102. Various other electronic components (such as LED's, charging circuitry and microcontrollers) may be housed in the base as well and, for clarity, are not shown in the figures. An electrical power cord 132 allows for connection to a power source (not shown). The power from the cord 132 is conveyed to a battery charger 144 and an electrical connector 166. An indicator light 136 on the front wall 116 indicates when power is being supplied to the assembly 100. A peripheral device connector 138, for example a telephone line connector, is connected to the connector 166 through the printed circuit board 130.

The holder 180 includes a body 182 preferably formed of a lightweight, durable, resilient material. More preferably, the holder 180 is formed of a polymeric material such as ABS or polystyrene. The body 182 is sized and shaped to frictionally hold the personal electronic device 5 securely such that insertion of the device 5 into or removal of the device 5 from the holder 180 may be accomplished by sliding the device 5 in and out from the top of the holder 180. Suitable alternative designs will be apparent to those of ordinary skill in the art from a reading of the description herein. A clip 184 is integrally molded or separately formed and attached by adhesive, fasteners or the like to the rear wall of the body 182. A connector slot 194, a pair of mounting slots 192, and a pair of locator recesses 196 are formed in the bottom wall 190 of the holder 180.

The holder 180 is joined to the base 102 by a hinge block 150. The hinge block 150 includes a body 152 and is preferably formed of integrally molded polymeric material, such as ABS or polystyrene, with the exception of portions of the connector 166 which are embedded therein. End tabs 154 and hinge projections 156 extend from either end of the body 152. Resilient latch posts 162 having barbs 162A extend upwardly from respective end tabs 154. A plurality of detents 158 and stops 159 are formed on the outer peripheries of the tabs 154. Projections 160 extend upwardly and rearwardly from the body 152. The connector 166 may be any suitable connector, for example a proprietary or standard electrical connector. Projections 166A of the connector are adapted to locate the connector 166 with respect to the corresponding, mating connector of the device 5. Terminals 168 are provided on the bottom of the connector 166 and extend from the bottom of the body 152. The terminals 168 are connected to the printed circuit board 130 by leads 134. Alternatively, the PCB (not shown) may be mounted in or on the hinge block 150.

The hinge block 150 is permanently mounted in the base 102 by inserting the hinge projections 156 in the holes 124A of the hinge tabs 124. The projections 156 are tapered to facilitate insertion. As best seen in FIG. 5, portions of the tabs 154 are received in the slot 112. More particularly, the edge 120 of the top member 110 engages the peripheries of the end tabs 154 and seats in adjacent detents 158. It will be appreciated from the foregoing that the hinge block 150 may be rotated about the hinge projections 156. The engagement between the edge 120 and the detents 158 allows the hinge block 150 to be rotated upon application of deliberate force, whereupon the flexible, resilient top member 110 deflects along the edge 120, but otherwise restricts rotation of the hinge block 150 relative to the base 102. The stops 159 prevent the hinge block 150 from being over-rotated. By provision of the plurality of detents 158, the holder may be rotated into and maintained in multiple angular positions. Other means for selectively adjusting the position of the holder include a frictional engagement which may include a wingnut or the like for selectively adjusting the amount of friction.

The holder 180 (and thereby the device 5 if mounted in the holder 180) may be mounted on the hinge block 150 (and, thereby, the base 102) by inserting the projections 160 into the slots 192. The holder 180 is then rotated forwardly to insert the connector 166 into the slot 194 and into the device 5 (if the device 5 is mounted in the holder 180). The holder 180 is rotated forwardly until the latch posts 162 are received in the locator recesses 196 and deflected outwardly as the holder 180 passes over the barbs 162A, and the latch posts 162 latch the holder 180 to the hinge block 150. The holder 180 (and the device 5 if mounted in the holder 180) may be removed from the hinge block 150 and the base 102 by reversing the foregoing steps, that is, pulling the latch posts 162 outwardly to free the holder 180 from the barbs 162A, and tilting the holder 180 rearwardly.

Preferably, and as shown in the figures, the holder 180 is rotatable with respect to the base 102 such that the orientation of the display 6 is adjustable with respect to vertical (i.e., the rotational axis of the holder 180 extends parallel to the plane of the support surface upon which the base 102 is placed). Preferably, the holder 180 may be selectively rotated through an angular range A (see FIG. 3) of at least 50 degrees, and more preferably through an angular range A of at least about 90 degrees. Preferably, in its most upright position (as shown in solid lines in FIG. 3), the angle of the display 6 with respect to vertical is no more than zero degrees. Accordingly, in the preferred configuration, the angle of the display 6 when mounted in the holder 180 on the base 102 is adjustable between an angle of zero degrees with respect to vertical (fully tilted forward) and an angle of 90 degrees with respect to vertical (when fully tilted back).

The battery receptacle 140 has a suitable electrical connector 144 which is connected to the power supply line 132. The battery receptacle 140 also includes projections 142 molded into the top member 110 to locate the battery or other device. As noted above, the receptacle 140 may be adapted to receive another personal electronic device.

With reference to FIGS. 7–10, a stand and holder assembly according to a second embodiment of the present invention is shown therein and generally designated 200. The assembly 200 differs from the assembly 100 in that the assembly 200 lacks a hinge block. Also, the assembly 200 employs electrical contacts and a latch mechanism of a different design than described above.

The assembly 200 includes a base 202 and a holder 280. In a manner similar to that described above with regard to the assembly 100, the holder 280 may be rotated with respect to the base 202. Also, the holder 280 may be selectively mounted, removed, and remounted on the base 202.

The base 202 includes a bottom plate 204 and a top member 210. The top member 210 includes a battery receptacle 240, a pivot recess 214, a front wall 216, slots 211, a guide wall 222, and contact slots 223. Edges 221 extend along the rear edges of the slots 211. A printed circuit board 230 is housed in the base 202 and is connected to a power supply by a power line 232. Contacts 266 are electrically connected and secured to the printed circuit board 230. Portions of the contacts 266 extend upwardly through the respective slots 223. A latch mechanism 250 is housed in the base 202.

The holder 280 includes a body 282 and a clip 284. The holder 280 corresponds to the holder 180 except as follows. A bottom wall 290 of the holder 280 has a pair of slots 290 formed therein. A pair of tabs 274 depend from the bottom wall 290. Projections 276 extend inwardly from respective ones of the tabs 274. A plurality of detents 278 and stops 279 are formed on the peripheries of the tabs 274. Preferably, the tabs 274, the projections 276, the detents 278 and the stops 279 are integrally molded with the bottom wall 290.

Figure 9:
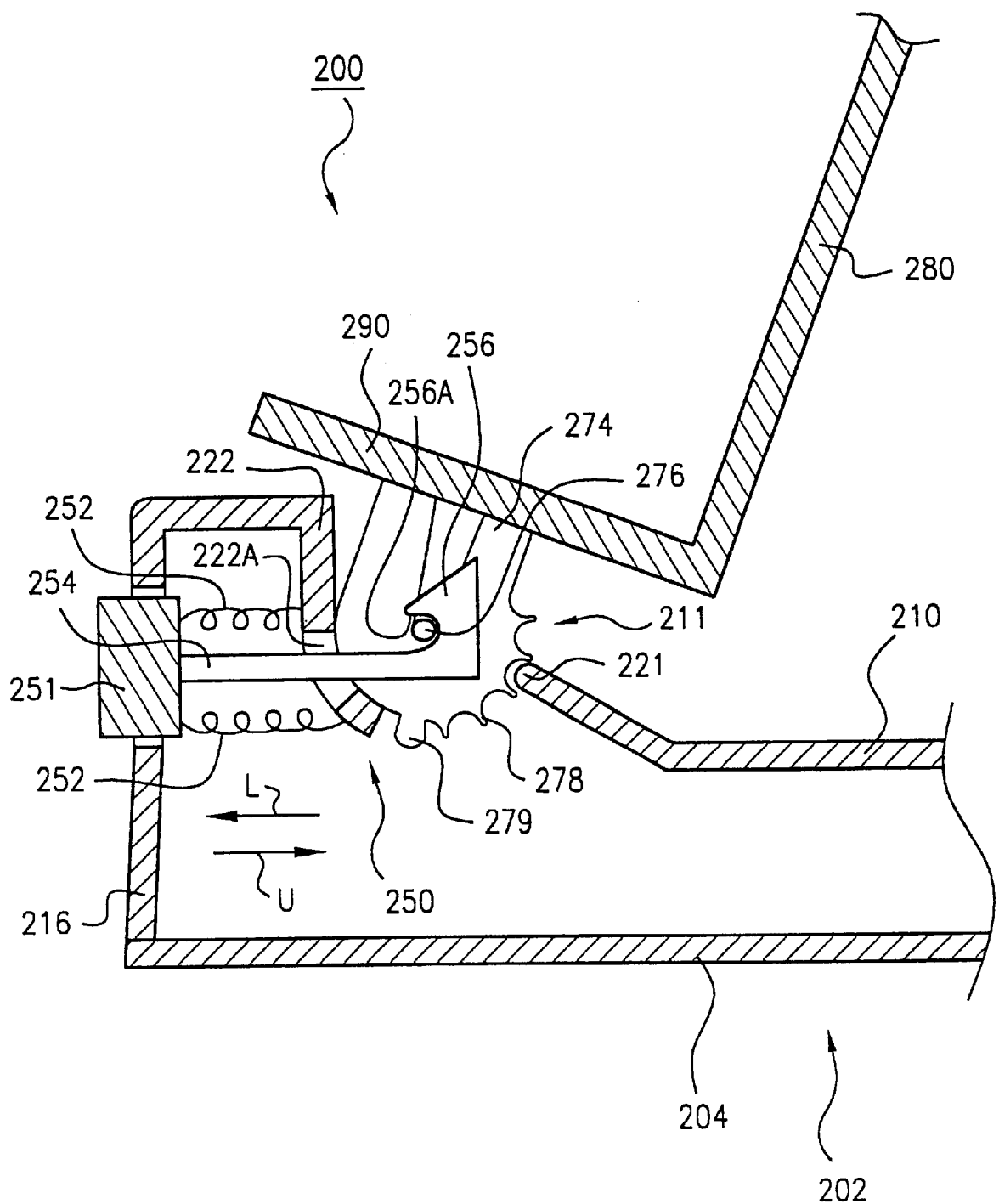
FIG. 9 is a partial, enlarged cross sectional view of the personal electronic device stand and holder assembly of FIG. 7 taken along the line 9—9 of FIG. 7.

As best seen in FIG. 9, the latch mechanism 250 cooperates with the tabs 274 (only one tab is shown in FIG. 9) to rotatably and removably mount the holder 280 to the base 202. The latch mechanism 250 includes a push button 251 and a shaft 254 having a hook 256 on the end thereof. The hook 256 defines a recess 256A. The shaft 254 extends through a hole 222A in the curved guide wall 222. The push button 251 and, hence, the hook 256, are biased forwardly (that is, in the direction L) by springs 252 which bear against the wall 222. The holder 280 may be mounted on the base 202 by pushing the tabs 274 down, whereupon, because of the shapes of the hooks 256, the hinge projections 276 displace the hooks 256 rearwardly (that is, in the direction U) until the hinge projections 276 enter the respective recesses 256A, allowing the hooks 256 and the button 251 to return to their original positions. The tabs 274 are then securely held between the wall 222 and the hooks 256. To remove the holder from the base 202, the user pushes the push button 251 in the direction U to displace the hooks 256 in the direction U, and pulls the freed holder 280 upwardly.

It will be appreciated that the wall edges 221, detents 278 and stops 279 cooperate to allow the holder 280 to be rotated upon application of deliberate force but otherwise restrict rotation of the holder 280 relative to the base 202, and further, prevent the holder 280 from being over-rotated. Further, it will be appreciated that the described construction allows the user to angularly position the holder 280 in multiple positions.

Figure 10:
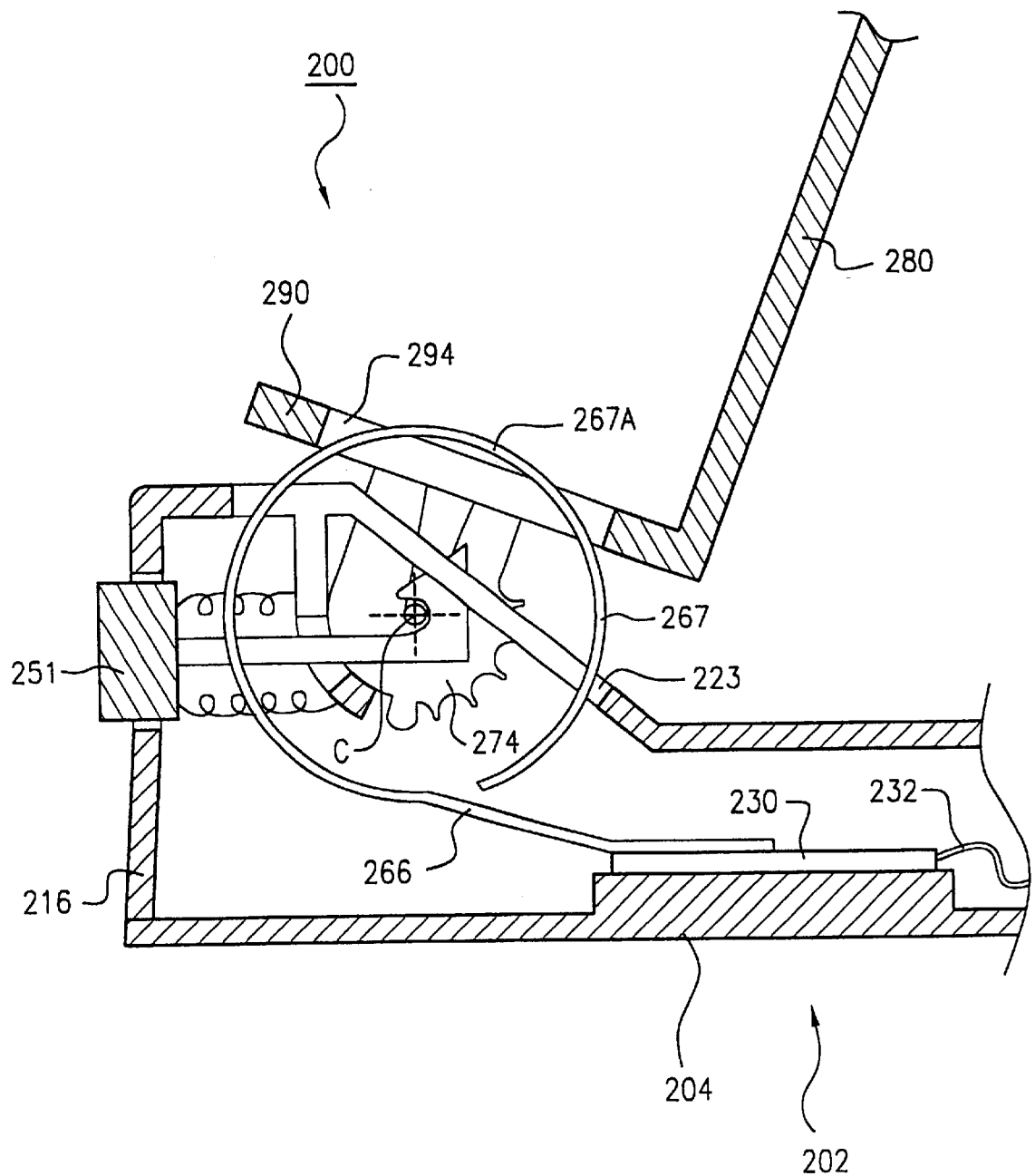
FIG. 10 is a partial, enlarged cross sectional view of the personal electronic device stand and holder assembly of FIG. 7 taken along the line 10—10 of FIG. 7.

As best seen in FIG. 10, each of the contact members 266 includes a loop portion 267A. Portions of the loops 267A extend through the respective slots 223. Moreover, portions of the loops 267A extend through respective slots 294 in the holder when the holder 280 is mounted to the base 202. At least the portions of the loops 267A in the path of the slots 294 for a prescribed range of motion of the holder 280 have the same axes as the axis of a rotation of the holder 280. Preferably, each loop 267A is substantially circular nd has as its axis the axis of rotation of the holder 280. In this way, the contacts 266 maintain continuous and substantially uniform pressure against the device 5 in the holder 280 through the range of rotation.

Preferably, the assembly 200 provides for the same ranges of motion and positioning as the assembly 100. Preferably, the holder 280 and the base 202 of the assembly 200 are formed of the same materials as described above for the holder 180 and the base 102.

The foregoing is illustrative of the present invention and is not to be construed as limiting thereof Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An assembly for supporting a personal electronic device, said assembly comprising:
   a) a base; and
   b) a holder configured to hold the device;
   c) a hinge member rotatably connecting said holder to said base, said hinge member including at least one tab secured to and depending from said holder, said tab receivable in said base;
   d) a spring biased latch mechanism;
   e) wherein said tab is removably connected to said base by said latch mechanism such that said holder is selectively removable from and replaceable on said base; and
   f) wherein said holder is adjustably connected to said base such that said holder is selectively repositionable relative to said base to allow the device to be reoriented relative to the base.

2. The assembly of claim 1 further including a hinge projection extending from said tab, wherein said latch mechanism selectively engages said hinge projection to restrict removal of said tab from said base.

3. The assembly of claim 2 wherein said hinge projection is integrally molded with said tab.

4. The assembly of claim 2 wherein said hinge projection extends from said tab along a substantially horizontal axis such that said holder is rotatable about said hinge projection relative to said base about said substantially horizontal axis.

5. The assembly of claim 2 wherein:
   said latch mechanism includes a latch member engaging said hinge projection and a spring biasing said latch member into a latched position; and
   said latch member is adapted to be displaced against the bias of said spring to disengage said latch member from said hinge projection.

6. The assembly of claim 5 wherein said latch member includes a hook portion adapted to engage said hinge projection.

7. The assembly of claim 5 wherein said latch mechanism includes a button operable to displace said latch member against the bias of said spring.

8. The assembly of claim 2 wherein:
   said hinge projection extends from said tab along a rotational axis extending through said tab; and
   said holder is rotatable relative to said base about said hinge projection about said rotational axis.

9. The assembly of claim 1 further including means for selectively adjusting and retaining an angle between said holder and said base.

10. The assembly of claim 9 wherein said adjusting and retaining means includes a plurality of detents on said tab, said detents adapted to engage said base.

11. The assembly of claim 1 including an electrical contact on said base adapted to engage the personal electronic device when the personal electronic device is mounted on said holder and said holder is mounted on said base.

12. A personal electronic device assembly, said assembly comprising:
   a) a base;
   b) a holder; and
   c) a personal electronic device mounted in said holder;
   d) a hinge member rotatably connecting said holder to said base, said hinge member including at least one tab secured to and depending from said holder, said tab receivable in said base;
   e) a spring biased latch mechanism;
   f) wherein said tab is removably connected to said base by said latch mechanism such that said holder is selectively removable from and replaceable on said base; and
   g) wherein said holder is adjustably connected to said base such that said holder is selectively repositionable relative to said base to allow the device to be reoriented relative to the base.

* * * * *